US010889678B2

(12) United States Patent
Al Hamouz et al.

(10) Patent No.: US 10,889,678 B2
(45) Date of Patent: Jan. 12, 2021

(54) AMINE-BASED POROUS POLYMER FOR SELECTIVE CARBON DIOXIDE CAPTURE

(71) Applicant: KING FAHD UNIVERSITY OF PETROLEUM AND MINERALS, Dhahran (SA)

(72) Inventors: Othman Charles S. Al Hamouz, Dhahran (SA); Mahmoud Mohamed Abdelnaby, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 16/259,427

(22) Filed: Jan. 28, 2019

(65) Prior Publication Data

US 2020/0239617 A1 Jul. 30, 2020

(51) Int. Cl.
| | | |
|---|---|---|
| C08G 12/26 | (2006.01) | |
| C08G 12/06 | (2006.01) | |
| C08G 12/08 | (2006.01) | |
| C08G 12/40 | (2006.01) | |
| B01J 20/26 | (2006.01) | |
| B01J 20/28 | (2006.01) | |
| B01D 53/14 | (2006.01) | |
| B01D 53/92 | (2006.01) | |

(52) U.S. Cl.
CPC ......... *C08G 12/26* (2013.01); *B01D 53/1475* (2013.01); *B01J 20/262* (2013.01); *B01D 53/92* (2013.01); *B01J 2220/4812* (2013.01)

(58) Field of Classification Search
None
See application file for complete search history.

(56) References Cited

U.S. PATENT DOCUMENTS 3,615,975 A 10/1971 Gillern et al.

FOREIGN PATENT DOCUMENTS

| CN | 102766272 B | 3/2014 |
| CN | 102875835 B | 7/2014 |
| CN | 105197925 B | 3/2018 |

OTHER PUBLICATIONS

M. Abdelnaby, et. al, "Carbon dioxide capture in the presence of water by an amine-based crosslinked porous polymer" Journal of Materials Chemistry A, Jan. 1, 2018, pp. 1-8.

(Continued)

*Primary Examiner* — Daniel Berns
(74) *Attorney, Agent, or Firm* — Oblon, McClelland, Maier & Neustadt, L.L.P.

(57) ABSTRACT

An amine-functionalized, crosslinked porous copolymer can be synthesized by linking 1,4-benzenediamine and pyrrole with p-formaldehyde in the presence of concentrated hydrochloric acid catalyst. The polymer is permanently microporous, with a BET surface area of 250 to 350 m$^2$/g. Due to the high concentration of polar amines within its backbone, the polymer exhibits a $CO_2$ uptake of 17.5 to 30 cm3/g at 298 K and 1 bar, but demonstrated a remarkably high selectivity for $CO_2$ over $N_2$ at 298 K. Dynamic breakthrough experiments indicate that this material is an effective adsorbent for selectively separating $CO_2$ from a dry and wet gas mixture containing $N_2$ for over 45 cycles without significant loss of performance. Furthermore, the polymer can be regenerated at room temperature after each cycle by a simple $N_2$ flow.

16 Claims, 5 Drawing Sheets

(56) References Cited

OTHER PUBLICATIONS

J. He, et. al, "Facile Synthesis of Nitrogen-Doped Porous Carbon for Selective CO2 Capture" Energy Procedia, vol. 63, 2014, pp. 2144-2151.

D. Lee, et. al, "Amine-Functionalized Porous Polymer Network for Highly Selective Absorption of CO Over N2" Macromolecular Chemistry and Physics, vol. 216, Issue 5, Dec. 22, 2014, pp. 1-2 (Abstract Only).

J. Zhu, et. al, "Synthesis and CO2 Capture Behavior of Porous Cross-Linked Polymers Containing Pendant Triazole Groups" Industrial & Engineering Chemistry Research, vol. 56, Issue 36, Jul. 26, 2017, p. 1 (Abstract Only).

AMINE-BASED POROUS POLYMER FOR SELECTIVE CARBON DIOXIDE CAPTURE

An article in *J. Mater. Chem. A*, 2018, 6, 6455-6462, entitled, "Carbon dioxide capture in the presence of water by an amine-based crosslinked porous polymer," was published on Mar. 26, 2018. This publication is incorporated herein by reference in its entirety.

BACKGROUND OF THE INVENTION

Field of the Invention

This application relates to porous organic polymer materials and their manufacture, particularly porous, cross-linked condensation polymers adapted to selectively capture $CO_2$ gas, as well as compositions and devices containing such polymers.

Description of the Related Art

Increasing global $CO_2$ emissions stemming from the burning of various fossil fuels require an urgent, yet practical solution. Of the different approaches to solving this challenge, post-combustion $CO_2$ capture is attractive as one can effectively eliminate the problem at the source. However, current technology relies on expensive, energy inefficient, and corrosive aqueous amine solutions. More effective post-combustion $CO_2$ capture processes using porous adsorbent materials have thus been sought.

Selecting materials viable for this application generally takes at least the following seven criteria into consideration: (i) relatively high $CO_2$ adsorption capacity—since $CO_2$ represents 15 to 16% v/v concentration of a flue gas stream, adsorption capacity must be relatively high at low partial pressures (<0.2 bar); (ii) high selectivity toward $CO_2$-selectivity governs the purity of the $CO_2$ obtained, which plays a critical role in the economics of the process; (iii) fast adsorption kinetics—adsorption kinetics are sufficiently fast to realize practical implementation, meaning that the equilibrium capacity, obtained from thermodynamic isotherms, is equal to the working capacity found in dynamic adsorption; (iv) mild regeneration conditions—the majority of the energy penalty in current post-combustion capture technologies is constituted by a substantial energy input required to regenerate the adsorbent material; (v) long-term stability over time/extensive use—the material must retain its performance over many adsorption-desorption cycles; (vi) tolerance to other components in a flue gas stream, including and most importantly, water—many conventional porous adsorbent materials, e.g., zeolites and porous carbon) suffer from water poisoning, while materials based on reticular chemistry, i.e. metal-organic frameworks, have recently indicated effectiveness in mitigating contaminants, such as water, in flue gas streams; and (vii) low production cost.

Given the above seven criteria, (i) to (vii), the development of a new porous adsorbent material represents a target worth pursuing. Porous organic polymers are speculated to be potential candidates to replace current technologies due to their potential for high and selective $CO_2$ uptake, their inclination and/or malleability to structural diversity, and physicochemical stabilities. A variety of porous organic polymers have been explored and several of these materials partially fulfill at least one of the aforementioned seven criteria.

CN 102875835 B to Yang et al. (Yang I) discloses a porous polyimide membrane and its preparation method comprising: mixing polyimide prepolymer and polyaldehyde in a solvent; adding polyamine to the mixture for reaction; forming a film after the reaction is finished; and immersing and washing the film in an acid to obtain the polyimide porous film. Yang I's obtained polyimide porous film has controllable aperture distributions from nanometer level to micrometer level.

However, Yang I relates to battery membranes/separators, and Yang I requires a polyimide prepolymer, made from a dianhydride and a diamine, with a $M_n$ from 1000 to 5000 for the synthesis of its final product. Moreover, Yang I requires a polyvalent aldehyde, such as glyoxal, glutaraldehyde, phthalaldehyde, terephthalaldehyde, 2,4-dimethyl-2-methoxymethyl-glutaraldehyde, and isophthalic aldehyde, and indicates that a wide variety of polyvalent amines are useful, for its end polymer. Yang I does not disclose an amine-functionalized cross linked porous polymer formed by acid catalyzed-condensation of an to aromatic diamine, such as 1,4-benzenediamine, a mono-aldehyde, such as formaldehyde or paraformaldehyde, and a pyrrole.

CN 102766272 B to Yang et al. (Yang II) discloses a porous material and its preparation method comprising: uniformly mixing a base material and polyaldehyde or polyketones in a solvent, then adding polyamine for a reaction, forming a film after the reaction, and immersing and washing in an acid to obtain the porous material. Yang II's method can be used to prepare different porous materials, and simultaneously pore size distribution from nanometer to micron order is controllable. Yang II's material is a polyethersulfone having an intrinsic viscosity of 0.24 to 0.36, polyimide prepolymer having a $M_n$ of 1000 to 5000, and polystyrene having a $M_w$ of 50,000 to 200,000, polylactic acid having a $M_v$ of 50,000 to 100,000, polyvinylidene fluoride having a $M_w$ of 400,000 to 600,000, polymethyl methacrylate having a $M_w$ of 350,000 to 400,000, an epoxy resin prepolymer having a $M_n$ of 300 to 1000, a phenolic resin prepolymer having a $M_n$ of 1000 to 5000, and a urea-formaldehyde resin prepolymer having a $M_n$ of 500 to 1000.

Yang II requires either a poly-aldehyde, such as glyoxal, glutaraldehyde, terephthalaldehyde, isophthalaldehyde, or 2,4-dimethyl-2-methoxymethylglutaraldehyde, or a polyketone, such as diacetyl, 3,4-hexanedione, or 4,5-octanedione. Yang II, like Yang I, requires that a pre-polymer, i.e., low molecular weight polymer/oligomer, be reacted with its poly-aldehyde and poly-amine. Yang II does not disclose an amine-functionalized cross linked porous polymer formed by acid catalyzed-condensation of an aromatic diamine, such as 1,4-benzenediamine, a mono-aldehyde, such as formaldehyde or paraformaldehyde, and a pyrrole.

CN 105197925 B to Huang et al. (Huang) discloses a nitrogen-doped activated carbon, its application, and a method of preparing nitrogen doped activated carbon. Huang's method involves: preparing a polymer gel substance with an aminal dynamic covalent network structure; preparing a polymer product with the aminal dynamic covalent network structure; then performing high-temperature pyrolysis to obtain the nitrogen-doped activated carbon. Huang's nitrogen-doped activated carbon prepared is used in supercapacitors as an electrode material.

Huang's activated carbon does not contain pyrrole before or after its pyrolysis, nor does Huang ultimately produce a porous organic polymer, much less an acid catalyzed-condensation product of an aromatic diamine, such as 1,4-benzenediamine, a mono-aldehyde, such as formaldehyde or paraformaldehyde, and a pyrrole.

U.S. Pat. No. 3,615,975 to Gilbern et al. (Gilbern) discloses a method of bonding materials, particularly wood, using foamed gap-filling adhesives is disclosed. Gilbern's adhesives are prepared using amine-modified aldehyde condensation polymers in which a foaming agent or agents have been incorporated. Gilbern's resins cure rapidly at ambient temperature and make excellent construction adhesives.

Gilbern's wood adhesive contains amine-modified aldehyde condensation polymers with a wide variety of components. Gilbern describes that its aldehyde condensation polymers can be any then (1969) well known and commercially available, including such resins as acid or base-catalyzed phenolic-aldehyde resins, urea-aldehyde resins, melamine-formaldehyde resins, acetone-formaldehyde resins, etc. Gilbern describes that condensation resins of formaldehyde with phenol, phenol-resorcinol, resorcinol, acetone, urea, melamine-urea, and melamine may be used, preferring water soluble, liquid, thermosetting phenol-aldehyde resins of the novolac or resole types. Gilbern reacts 0.7 to 1 part of its phenolic compound to 1 part aldehyde, preferably formaldehyde, then with 0.05 to 2.0 parts of an amine, including primary aromatic amines, bis-amino aryl compounds, aminonaphthalenes, or heterocyclic N-containing compounds (including pyrrole). Gilbern prefers m-phenylenediamine, m-hydroxyaniline, 1,5-diaminenaphthalene, 2,6-diaminopyridine, and 4,4'-methylene-dianiline, but does not disclose using two amines. Gilbern fails to describe porosity, nor a porous condensation product of an aromatic diamine, such as 1,4-benzenediamine, a mono-aldehyde, such as (para)formaldehyde, and a pyrrole.

*Energy Procedia* 2014, 63, 2144-2151, by He et al. (He) discloses solid-state post-combustion $CO_2$ sorbents that avoid vaporization of liquid water is avoided, tunable pore morphology, and greater chemical variability. He describes an ordered mesoporous nitrogen-doped carbon made by the coassembly of a modified-pyrrole and triblock copolymer through a soft-templating method, which differs from the hard-template approach. He describes a high surface area mesoporous carbon, which is comparable to the silica counterpart. He's porous carbon, with a Brunauer-Emmett-Teller (BET) specific surface area of 804.5 $m^2/g$, $CO_2$ capacities at 298 K of 1.0 and 3.1 mmol/g at 0.1 and 1 bar, respectively, and a $CO_2/N_2$ selectivity of 51.4. He's reports that its porous carbon can be fully regenerated solely by inert gas purging without heating, and stable for multiple adsorption/desorption cycles without reduction in $CO_2$ capacity.

He's system requires Pluronic P-123, i.e., poly(ethylene oxide)-poly(propylene oxide)-poly(ethylene oxide), with an $M_n$ of approx. 5800, and reacts this polyether prepolymer with pyrrole in the presence of ferric chloride in water, before calcining the product at 800° C. for 2 hours, pyrolyzing the resin to leave behind a final porous powder. He does not use an aldehyde, nor does He produce a porous polymer condensation product of an aromatic diamine, such as 1,4-benzenediamine, a mono-aldehyde, such as (para) formaldehyde, and a pyrrole.

*Macromol. Chem. & Phys.*, 2015, 216(5), 489-494, by Lee et al. (Lee) discloses porous polymeric sorbents showing selective $CO_2$ absorption over $N_2$ are prepared by conventional radical copolymerization of divinylbenzene and 4-vinylbenzyl chloride under solvothermal conditions, followed by surface modification of the pores with polyamines. Lee reports that its amine-functionalized porous materials that interact with $CO_2$ via chemisorption exhibit exceptionally high $CO_2/N_2$ selectivity of up to 373 times, determined by ideal adsorbed solution theory (IAST).

Lee discloses a radical polymerization of divinyl benzene and 4-vinylbenzene chloride, followed by polyamine compounds, such as ethylene diamine, diethylene triamine, triethylene tetramine, and tetraethylene pentamine. Lee does not disclose a polymerization of an aromatic diamine, such as 1,4-benzenediamine, a mono-aldehyde, such as (para) formaldehyde, and a pyrrole, nor the porous condensation product of such a polymerization.

*Ind. Eng. Chem. Res.*, 2017, 56(36), 10155-10163, by Zhu et al. (Zhu) discloses porous cross-linked polymers containing pendant triazole groups were synthesized from glycidyl methacrylate (GMA) in the presence of divinylbenzene via high internal phase emulsion (HIPE) templating method followed by functionalization with sodium 3-amino-1,2,4-triazole (ATANa). Zhu characterizes these spectroscopically and assesses them as $CO_2$ adsorbents, reporting interconnected hierarchical porous structure and abundant triazole groups which absorbed $CO_2$ chemically in 1:1 stoichiometry. Zhu reports that its adsorbents exhibit $CO_2$ adsorption capacity of 3.6 mmol/g, at 25° C. and 1 atm, $CO_2/N_2$ selectivity of approx. 30, $CO_2$ desorption with 58 kJ/mol $CO_2$ desorption heat, acceptable moisture endurance, and excellent recyclability, suggesting them for $CO_2$ capture.

Zhu does not disclose the use of a pyrrole or aldehyde. Zhu, like Lee, relates to a radical polymerization, here with divinyl benzene and a methacrylate, followed by functionalization with a charged but does not disclose a polymerization of an aromatic diamine, such as 1,4-benzenediamine, a mono-aldehyde, such as (para)formaldehyde, and a pyrrole, nor the porous condensation product of such a polymerization.

However, such materials have not been shown to have satisfactorily met most or all of the seven criteria mentioned above. Accordingly, the inventors disclose herein improved porous polymers, methods of making them, and gas separation and storage materials that address the performance requirement of polymers for $CO_2$ capture.

SUMMARY OF THE INVENTION

Aspects of the invention provide polymer(s) generally comprising, in polymerized form: 10 to 20 mol. %, relative to total monomers, CS-C10-aryl diamine; 50 to 65 mol. %, relative to total monomers, mono-aldehyde; and 20 to 35 mol. %, relative to total monomers, 5-membered heteroaromatic ring, wherein the polymer is cross-linked and its bulk is porous. Such polymers may be modified by any permutation of the inventive features described herein.

The heteroaromatic ring may comprise a pyrrole, imidazole, pyrazole, thiazole, oxazole, furan, thiophene, or mixture of two or more of any of these, preferably a pyrrole (preferably unsubstituted).

The diamine may comprise a 1,4-diaminobenzene, 1,3-diaminobenzene, 2,6-diaminopyridine, 2,5-diaminopyridine, 2,3-diaminopyridine, 2,4-diaminopyrimidine, 1,4-diaminonaphthalene, 1,5-diaminonaphthalene, 1,8-diaminonaphthalene, 2,3-diaminonaphthalene, 1,2-diaminonaphthalene, or a mixture of two or more of any of these, preferably a 1,4-diaminobenzene, preferably having no further functionalization.

The mono-aldehyde may comprise formaldehyde, acetaldehyde, propionaldehyde, butyraldehyde, isobutanal, or a mixture of these, preferably formaldehyde.

The diamine may be present in an amount of from 12.5 to 17.5 mol. %, the mono-aldehyde may be present in an amount of from 55 to 60 mol. %, and the heteroaromatic ring may be present in an amount of from 25 to 32.5 mol. %, wherein the diamine may be 1,4-diaminobenzene, the mono-aldehyde may be formaldehyde, and the heteroaromatic ring may be pyrrole. The diamine, the mono-aldehyde, and the heteroaromatic ring may make up 100 mol. % of the polymer.

Inventive polymers may have: a porosity in a range of from 250 to 350 m$^2$/g; and/or a $CO_2$ uptake capacity in a range of from 25 to 45 cm$^3$/g at 0° C. and 1 bar; and/or a $CO_2$ uptake capacity in a range of from 17.5 to 30 cm$^3$/g at 25° C. and 1 bar; and/or a coverage-dependent enthalpy of adsorption ($Q_t$) in a range of from 25 to 45 kJ/mol; and/or a $CO_2$ uptake versus $N_2$, in a selectivity in a range of from 200 to 300 at 273 K; and/or a $CO_2$ uptake versus $N_2$, at a selectivity in a range of from 125 to 165 at 298 K; and/or a dynamic $CO_2$ uptake capacity in a range of from 5 to 12 cm$^3$/g under dry conditions; and/or a dynamic $CO_2$ uptake capacity in a range of from 10 to 20 cm$^3$/g in at least 90% relative humidity; and/or an absorption diminution of no more than 15% after 45 cycles or more.

The polymer may be an amine-functionalized cross linked porous polymer formed by acid catalyzed-condensation of 1,4-benzenediamine, paraformaldehyde, and pyrrole in a molar ratio of 1:2 to 8:1 to 4.

Aspects of the invention provide exhaust treatment and/or gas storage apparatuses, comprising an inventive polymer in any permutation as described herein.

Aspects of the invention provide methods, comprising: contacting a gas mixture, comprising a first gas and a second gas, with an inventive polymer in any permutation as described herein, and thereby separating the first gas from the gas mixture.

Aspects of the invention provide methods of obtaining an amine-functionalized cross linked porous polymer in any permutation as described herein, wherein the method may comprise: (a) adding hydrochloric acid to a C5 to C10 aryl diamine and a mono-aldehyde in a solvent to form a first reaction mixture; (b) combining a 5-membered heteroaromatic ring with the first reaction mixture to form a second reaction mixture; and (c) heating the second reaction mixture at a temperature in a range of 70 to 120° C.

Inventive methods may be ones in which the diamine comprises or is 1,4-benzenediamine and is present in at least 10 mol. %, and/or wherein the mono-aldehyde comprises or is formaldehyde and is present in at least 50 mol. %, and/or wherein the heteroaromatic ring comprises or is pyrrole and is present in at least 25 mol. %. The solvent may comprise N,N-dimethylformamide.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
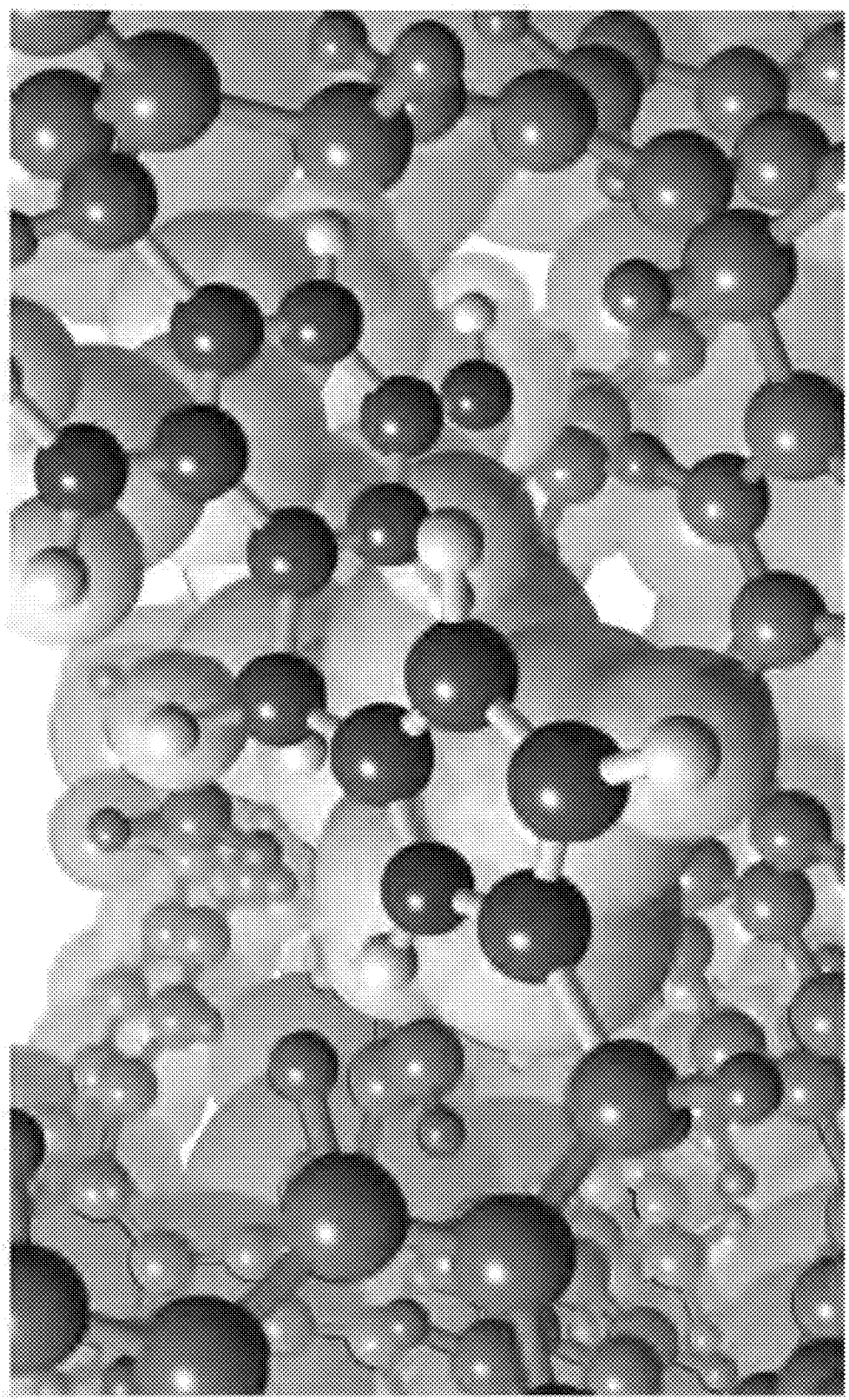
FIG. 1 illustrates structural features found on the backbone of a crosslinked, porous polymer according to the invention in a ball-and-stick model.

Aspects of the invention provide a polymer, comprising, in polymerized form: a C5 to C10 aryl diamine, a mono-aldehyde, and a 5-membered heteroaromatic ring, preferably 10 to 20 mol. %, 12.5 to 17.5 mol. %, 13.5 to 15.5 mol. %, or 14 to 15 mol. %, relative to total monomers, of the C5 to C10 aryl diamine, optionally a C5 to C6 aryl diamine; 50 to 65 mol. %, 52.5 to 62.5 mol. %, 55 to 60 mol. %, 56 to 59 mol. %, or 57 to 58 mol. %, relative to total monomers, of the mono-aldehyde, optionally a C1 to C3 mono-aldehyde; and 20 to 35 mol. %, relative to total monomers, of the 5-membered heteroaromatic ring, optionally N-heteroaromatic, wherein the polymer is cross-linked and porous. The "porosity" of the polymer (bulk) as used herein refers to the property of gas/fluid permeability of a three-dimensional mass of cross-linked polymer(s), i.e., a solid volume of polymer.

The heteroaromatic ring may comprise a pyrrole group, imidazole group, pyrazole group, thiazole group, oxazole group, furan group, thiophene group, or mixture of two or more of any of these groups, preferably a pyrrole group, whereby the reactive atom, which should generally be free of substituents for most applications, may be substituted on one or both alpha-positions to the electron directing heteroatom, esp. nitrogen.

Any of the heteroaromatic rings may be substituted with, e.g., one or two methyl, ethyl, C3 alkyl, C4 alkyl, fluoro, chloro, bromo, iodo, methylene carboxylic acid, ethylene carboxylic acid, propylene carboxylic acid, (protected) methylene amine, (protected) ethylene amine, (protected) propylene amine, nitrile, isocyanate, MOM, EOM, POM, C1 alcohol, C2 alcohol, C3 alcohol, nitrate, C1 nitrate, C2 nitrate, C3 nitrate, C1 amide, C2 amide, and/or C3 amide groups. Optionally amine or alcohol substituents may be protected as known in the art, esp. as taught in Green's Protective Groups in Organic Synthesis, 5$^{th}$ ed., Ed. Wuts, Peter G. M., Wiley, Hoboken: 2014, which is incorporated by reference in its entirety herein, while acetyl protection may be most useful in low cost applications contemplated. The heteroaromatic ring is usually preferred in unsubstituted form, at least for reducing costs.

The diamine may be substituted as discussed above and may comprise a 1,4-diaminobenzene, 1,3-diaminobenzene, 2,6-diaminopyridine, 2,5-diaminopyridine, 2,3-diaminopyridine, 2,4-diaminopyrimidine, 1,4-diaminonaphthalene, 1,5-diaminonaphthalene, 1,8-diaminonaphthalene, 2,3-diaminonaphthalene, 1,2-diaminonaphthalene, or a mixture of two or more of any of these, preferably a 1,3-diaminobenzene, 2,5-diaminopyridine, and/or 1,4-diaminobenzene, preferably 1,4-diaminobenzene having no further substitution. The para-substitution of the amines is generally preferred.

The mono-aldehyde may comprise formaldehyde, acetaldehyde, propionaldehyde, butyraldehyde, isobutanal, or a mixture of these, preferably formaldehyde. The formaldehyde may be in any form, e.g., formalin, 1,3,5-trioxane, or paraformaldehyde, preferably paraformaldehyde.

The diamine may be present in an amount of from 10 to 20 mol. %, preferably 12.5 to 17.5 mol. % or 14 to 16 mol. %, the mono-aldehyde may be present in an amount of from 50 to 65 mol. %, preferably 55 to 60 mol. % or 57.5 to 59 mol. %, and the heteroaromatic ring may be present in an amount of from 20 to 35 mol. %, preferably 25 to 32.5 mol. % or 28 to 30 mol. %, wherein the diamine may be 1,4-diaminobenzene, the mono-aldehyde may be formaldehyde, and the heteroaromatic ring may be pyrrole.

The diamine, the mono-aldehyde, and the heteroaromatic ring may make up 100 mol. % of the polymer, or these monomers may be at least 75, 80, 85, 90, 91, 92, 92.5, 93, 94, 95, 96, 97, 97.5, 98, 99, 99.1, 99.5, or 99.9 wt. % of a total weight of the polymers, i.e., of all monomers. The particular monomers 1,4-benzenediamine, paraformaldehyde, and pyrrole may make out at least 75, 80, 85, 90, 91, 92, 92.5, 93, 94, 95, 96, 97, 97.5, 98, 99, 99.1, 99.5, 99.9, 99.99, or 99.999 wt. % of a total weight of monomers used in the polymers. For example, the polymer may be an amine-functionalized cross linked porous polymer formed by acid catalyzed-condensation of 1,4-benzenediamine, paraformaldehyde, and pyrrole in a molar ratio in a range of 1:2 to 8:1 to 4, or 1:3 to 7:2 to 3, and generally centered around 1:4:2 (diamine:aldehyde:heteroaryl).

Porosity as used herein generally means that the bulk polymer is permeable to the gases it is used to separate, though porosity herein may mean having (a) pores smaller than 2 nm in diameter, and/or (b) pores between 2 and 50 nm in diameter, and/or (c) pores greater than 50 nm in diameter, preferably (a), (b), or (a) and (b). Since $N_2$ has a diameter of approximately 370 pm, $O_2$ has a diameter of 304 pm (Van der Waals radius of 152 pm), and $CO_2$ has a diameter of 324 pm, the average pore diameter should generally be above 300 pm, e.g., at least 325, 350, 400, 450, 500, 600, 750, 1000, 1500, 2000, or 2500 pm. These may be lower or upper endpoints of the average pore diameter of useful polymer bulks, as may upper limits of no more than 75, 50, 40, 33, 25, 20, 17.5, 15, 12.5, 11, 9, 8, 7.5, 7, 6, 5, 4, 3, 2.5, or 2 nm. Useful average pore sizes may have any of these endpoints, and/or may be in a range of from 0.4 to 45, 0.65 to 35, 0.7 to 27.5, 0.8 to 22.5, 0.85 to 18, 0.9 to 14, 0.95 to 12, or 1 to 10 nm. The pore volume may be at least 0.1 vol. % of the total bulk polymer volume, or at least 0.25, 0.5, 0.75, 1, 1.5, 2.5, 5, 6, 7, 8, 9, 10, 12.5, 15, 17.5, or 20 vol. %, and/or no more than 50, 40, 33, 30, 27.5, 25, 22.5, 20, 18, 16, 14, 12, 11, 7.5, or 5 vol. %, any of these endpoints being combinable according to the application.

The cross-linking degrees useful within the scope of the invention will vary depending upon the desired application, but may vary in a range of from 1 to 75% cross-links of polymerized monomer based on the total count of polymerized monomers, or 5 to 60, 10 to 50, 15 to 45, 20 to 40%, and/or at least 2.5, 5, 7.5, 12.5, 17.5%, and/or no more than 80, 65, 55, 45, 35, 33, 30, 27.5, or 25%, while any of these endpoints may be combined depending upon the desired application. Generally, the aldehyde is considered to be a condensation cross-linking agent in reactions of the sort described herein, whereby the aldehyde is normally condensed to a methylene bond between, e.g., the amine of the diamine and/or the alpha-position on the pyrrole and/or other heteroaromatic ring.

The inventive polymers may have a porosity in a range of from 250 to 350, 267 to 333, 275 to 325, 290 to 315, or 300 to 310 m²/g. In addition or independently, inventive polymers, at 1 bar, may have a $CO_2$ uptake capacity in a range of from 25 to 45, 27.5 to 42.5, 30 to 40, 32.5 to 37.5, or 33 to 36 cm³/g at 0° C., and/or in a range of from 17.5 to 30, 20 to 27.5, 21 to 26, 22 to 25, or 23 to 24 cm³/g at 25° C. In addition or independently, inventive polymers may have a coverage-dependent enthalpy of adsorption ($Q_{st}$) in a range of from 25 to 45, 27.5 to 42.5, 30 to 40, 32 to 38, or 33 to 35 kJ/mol. In addition or independently, inventive polymers may have a $CO_2$ uptake versus $N_2$, with a selectivity in a range of from 200 to 300, 210 to 290, 220 to 280, 225 to 275, 233 to 267, 240 to 260, 245 to 255 at 273 K, and/or in a range of from 125 to 165, 130 to 160, 133 to 150, 135 to 145, or 137.5 to 142.5 at 298 K. In addition or independently, inventive polymers may have a dynamic $CO_2$ uptake capacity in a range of from 5 to 12, 6 to 11, 7 to 10, 7.5 to 9.5, 8 to 9, or 8.25 to 8.75 cm³/g under dry conditions, and/or in a range of from 10 to 20, 11 to 19, 12 to 18, 12.5 to 17.5, 13.3 to 16.7, 14 to 16, or 14.5 to 15.5 cm³/g under at least 50, 67, 75, 85, 90, or 95% relative humidity. In addition or independently, inventive polymers may have an absorption diminution of no more than 15, 12.5, 10, 9, 8, 7.5, 7, 6, 5, 4, 3.33, 3, or 2.5% after at least 45, 50, 60, 75, 80, 90, 100, or even 150 cycles as long as the structure remains intact, though generally up to 1000, 750, 625, 500, 400, 350, 300, 250, 200, 150, 125, or 100 cycles.

Aspects of the invention provide exhaust treatment and/or gas storage apparatuses, to comprising an inventive polymer in any permutation as described herein. Useful applications include disposition in a filter container, in a (pressure) storage container, in a pressure swing adsorber, or the like. The container could be a temporary pass-through container, before passing the separated gas off to further processing, compression, and/or final storage. Containers comprising the inventive polymers may be of a variety of sizes based on intended use, e.g., vehicles, households, plants, etc., 10 to 100 L, 1 to 10 m³, 10 to 100 m³, or 100 to 2000 m³.

Aspects of the invention provide methods, comprising: contacting a gas mixture comprising a first gas and a second gas, with an inventive polymer in any permutation as described herein, and thereby separating the first gas from the gas mixture. Gases in the mixture may be $CO_2$, $N_2$, $O_2$, $H_2O$, CO, and/or Ar, particularly $CO_2$ and $N_2$, or $CO_2$, $N_2$, and $H_2O$. The gas preferentially separated may be any of these, depending upon the tailoring of the polymer, but generally will be $CO_2$.

Aspects of the invention provide methods of obtaining an amine-functionalized cross linked porous polymer in any permutation as described herein, wherein the method may comprise: (a) adding hydrochloric acid to a C5 to C10 aryl diamine as described above, and a mono-aldehyde as described above, in a solvent to form a first reaction mixture; (b) combining a 5-membered heteroaromatic ring as described above with the first reaction mixture to form a second reaction mixture; and (c) heating the second reaction mixture at a temperature in a range of 70 to 120, 80 to 110, 85 to 100, or 87.5 to 95° C. The polymer generally should not be heated above 600, 500, 400, 300, or 250° C., if intended for use in gas separation. The solvent will generally be a polar, preferably aprotic, solvent, or may include N,N-dimethylformamide (DMF), N,N-dimethylacetamide, N-methyl pyrrolidone (NMP), dimethyl sulfoxide (DMSO), tetrahydrofuran (THF), 1,4-dioxane, dichloromethane, chloroform, carbon tetrachloride, methanol, ethanol, isopropanol, and/or water, though DMF is particularly preferred (which may be dry, but is not required to be dry).

Inventive methods may be ones in which the diamine comprises or is 1,4-benzenediamine and is present in at least 10 mol. %, and/or wherein the mono-aldehyde comprises or is formaldehyde and is present in at least 50 mol. %, and/or wherein the heteroaromatic ring comprises or is pyrrole and is present in at least 25 mol. %. The solvent may comprise N,N-dimethylformamide. The ratios of the monomers may be as described for the starting materials of any of the polymers above.

Working Example—Materials: Pyrrole (98% purity), 1,4-benzenediamine (98% purity), methanol (99.9% purity), N,N-dimethylformamide (DMF, 99% purity), and hydrochloric acid (37 wt. %) were purchased from Sigma Aldrich Co. Anhydrous iron(III) chloride (≥99.99% purity) was acquired from Alpha Chemika. Paraformaldehyde (≥99% purity) was obtained from Fluka. Ammonium hydroxide (28-30 w/w %) was purchased from Fisher Scientific. Pyrrole was distilled under $N_2$ flow at 145° C. and stored under a $N_2$ environment at −4° C. prior to use. All other chemicals were used without further purification. For gas sorption measurements, ultrahigh purity grade nitrogen (99.999%), helium (99.999%), and high purity $CO_2$ (99.9%) were obtained from Abdullah Hashem Industrial Co., Dammam, Saudi Arabia.

Working Example—Analytical Methods: $^{13}C$ solid state nuclear magnetic resonance (NMR) spectroscopy measurements were performed on a Bruker 400 MHz spectrometer operating at 125.65 MHz (11.74 T) and at ambient temperature (298 K). Samples were packed into 4 mm $ZrO_2$ rotors and cross-polarization magic angle spinning (CP-MAS) was employed with a pulse delay of 5.0 s and a magic angle spinning rate of 10 kHz for the 1,4-benzenediamine monomer or 14 kHz for the polymer. Fourier transform infrared (FT-IR) spectroscopy measurements were performed from KBr pellets using a PerkinElmer 16 PC spectrometer. The spectra were recorded over 4000 to 400 $cm_{-1}$ in transmission mode and the output signals were described as follows: s, strong; m, medium; w, weak; and br, broad. Thermal gravimetric analysis (TGA) was run on a TA Q-500 instrument with the sample held in a platinum pan under air flow with a 10° C. per min heating rate. To identify the type of gases trapped within the pores, thermogravimetric analysis-mass spectrometry (TGA-MS) was performed using a QMS 403 C Aëolos with an STA 449 F1 Jupiter instrument. Powder X-ray diffraction (PXRD) measurements were carried out using a Rigaku MiniFlex II X-ray diffractometer with Cu $K_\alpha$ radiation (λ=1.54178 Å). Low pressure nitrogen sorption isotherms were collected on a Micromeritics ASAP 2020. A liquid nitrogen bath was used for the measurements at 77 K. Isotherms of $CO_2$ sorption were carried out on an Autosorb iQ2 volumetric gas adsorption analyzer. The measurement temperatures at 273 K (0° C.) and 298 K (25° C.) were controlled with a water circulator. Water adsorption measurements were performed on a DVS Vacuum, Surface Measurement Systems Ltd, London, UK. Prior to these measurements, the porous polymer material synthesized according to the Example was pre-treated by heating (383 K, i.e., 110° C.) under vacuum for 10 hours using the Dynamic Vapor Sorption Analyzer.

Working Example—Synthesis: 1,4-Benzenediamine (1.08 g, 10.0 mmol) and paraformaldehyde (1.20 g, 40.0 mmol) were added with 70 mL DMF to a 100 mL round bottom flask and stirred at room temperature for 5 min. After this, 1.6 mL conc. HCl (12 M) was added dropwise into the reaction mixture and the flask was sealed with a rubber septum and purged with $N_2$ for 2-3 min. Pyrrole (1.34 g, 20.0 mmol) was then added into the reaction mixture and stirred for an additional 5 min. The mixture was subsequently heated at 363 K (90° C.) in an oil bath for 24 h with continuous stirring at a rate of 200 rpm. After this time elapsed, a black solid was isolated by centrifugation and filtration. The solid was washed with 40 mL of methanol followed by sonication for 30 min. The solid was filtered and immersed in an ammonium hydroxide solution (25% w/w) for 24 h, 40 mL distilled water for 24 h, and 60 mL of methanol per day for 3 days with stirring, at which time a clear filtrate solution was obtained. Finally, the product was dried at 348 K (75° C.) under vacuum (<0.1 bar) for 20 h. The final yield (2.56 g) was 88% based on the monomers weights. FT-IR (KBr, 4000 to 400 $cm_{-1}$): 3413 (br), 3240 (br), 2918 (w), 2852 (w), 1618 (m), 1510 (w), 1423 (w), 1024 (w), 671 (m).

Working Example—Measurements: A bed was packed with a powder (1.12 g) of the polymer and the sample was activated at 373 K (100° C.) under vacuum for 24 hours prior to carrying out the breakthrough measurements. The breakthrough experiments were conducted under ambient conditions (298 K—25° C.—and 1 bar) with a 10 sccm flowrate of $CO_2$:$N_2$ (20:80 v/v) feed mixture. For the measurements under humid conditions, the sample bed was subjected to a stream of wet $N_2$ gas (91% relative humidity, RH), in which the water level in the gas stream was monitored until saturation was obtained as detected by mass spectrometry. At this point, dry $CO_2$ was introduced into the wet $N_2$ stream with the same flowrate as the dry conditions noted above. The full breakthrough capacity of $CO_2$ and $N_2$ was measured by evaluating the ratio of compositions of the downstream gas and the feed gas.

With an aim to synthesize a porous polymer based on inexpensive monomers containing accessible $CO_2$-philic functional groups. Simple pyrrole and 1,4-benzenediamine were determined to be useful monomers since pyrrole and 1,4-benzenediamine have integrated polar aromatic amine moieties, which can induce strong interactions with $CO_2$, within their molecular structures. The synthetic strategy used to crosslink these $CO_2$-philic monomers was based on an acid catalyzed polycondensation reaction whereby p-formaldehyde, or other forms of formaldehyde or appropriate aldehydes, can serve as a linking agent.

Experiments to optimize the reaction conditions, the solvent (dichloroethane, DMF, or to dimethylsulfoxide) and the catalyst (conc. HCl, $FeCl_3$, or CuCl) were undertaken. While conventional Lewis acid catalyzed polycondensation reactions typically use $FeCl_3$ as the catalyst, in equimolar amounts, in order to activate the linking agent, our findings indicate that a catalytic amount of conc. HCl (10 mol % of p-formaldehyde), generally with DMF as the solvent, can provide unexpectedly superior results. These conditions can produce crosslinked, porous polymer product in up to 88% yield, i.e., at least 50, 60, 70, 75, 80, 85, 90, or even 95%. However, inventive porous polymer materials can be synthesized using the other catalysts or solvents, though such products can suffer lower yield, surface area, or $CO_2$ sorption uptake. After synthesis, the inventive porous polymer materials may be washed with water and methanol followed by a solution of ammonium hydroxide in order to remove any unreacted starting materials and to neutralize any residual acid. Prior to use in further characterization, the inventive porous polymer materials can be activated at 75° C. under dynamic vacuum for 20 hours, as done in the Example, or, e.g., at least 2, 3, 5, 8, 10, 12, 16, 18, or 24 hours.

Inventive polymer materials and/or compositions may combine in any permutation any of the following features. Polymeric materials within the scope of the invention may exclude poly-aldehydes, i.e., molecules with more than one aldehyde per molecular weights of 500 g/mol or less, or may contain no more than 15, 10, 7.5, 5, 4, 3, 2, 1, or 0.5 wt. %, relative to the total aldehyde weight, of poly-aldehydes. Polymeric materials within the scope of the invention may exclude polyimide(s), polyethersulfone(s) (PES), polystyrene(s) (PS), polylactic acid(s) (PLA), polyvinylidene fluoride(s) (PVdF), polymethyl methacrylate(s) (PMMA), epoxy resin(s), phenolic resin(s), urea-formaldehyde resin(s), divinylbenzene-maleic anhydride copolymer, and/or polyether (esp. pluronic P-123, i.e., poly(ethylene oxide)-poly(propylene oxide)-poly(ethylene oxide),), or may contain no more than 15, 10, 7.5, 5, 4, 3, 2, 1, or 0.5 wt. %, relative to the total polymer weight, of polyimide(s), PES, PS, PLA, PVdF, PMMA, epoxy resin(s), phenolic resin(s), urea-formaldehyde resin(s), divinylbenzene-maleic anhydride copolymer(s), and/or polyether(s). Inventive compositions comprising the porous polymeric material may contain no more than 10, 5, 2.5, 1, 0.5, 0.1, 0.01, 0.001, 0.0001 wt. % carbon black and/or pyrolyzed carbon, or no more than the minimum detectable amount of carbon black and/or pyrolyzed carbon. Inventive compositions comprising the porous polymeric material may contain no more than 10, 5, 2.5, 1, 0.5, 0.1, 0.01, 0.001, 0.0001 wt. % foaming agent(s), relative to the total composition weight, or no more than the minimum detectable amount of foaming agent(s). Inventive polymeric materials may contain, in polymerized form, no more than 5, 2.5, 1, 0.5, 0.1, 0.01, 0.001, 0.0001 mol. % carbazole(s), triazole(s), organic anhydride(s), and/or methacrylate (esp. glycidyl methacrylate). Compositions including the polymeric materials within the scope of the invention may exclude metal-organic frameworks (MOFs), or comprise no more than 40, 33, 25, 20, 15, 10, 7.5, 5, 4, 3, 2, 1, or 0.5 wt. %, relative to the total composition weight, of MOFs. Inventive polymeric materials generally have no surface modification, and/or may contain, in polymerized form, at least 75, 80, 85, 90, 92.5, 95, 96, 97, 97.5, 98, 99, 99.1, 99.5, or 99.9 mol. % monomers having Mn (or MW) of no more than 950, 750, 625, or 500 (g/mol).

Inventive porous polymers described herein can be synthesized via acid catalyzed polycondensation of the inexpensive, $CO_2$-philic monomers pyrrole and 1,4-benzenediamine with p-formaldehyhde as the linking agent, which can fulfill criterion (vii) discussed herein. Synthetic design strategies can be established to increase the density of polar aromatic amines within the backbone of the resulting polymer, and thus increase the material's affinity to $CO_2$. Inventive porous polymer materials can be produced, particularly as described herein, that are permanently (micro)porous with relatively high $CO_2$ uptake capacity at relevant partial pressures, fulfilling criterion (i), and good $CO_2$-vs.-$N_2$ selectivity, fulfilling criterion (ii). Dynamic breakthrough measurements were then performed, in which inventive polymeric material was demonstrated capable of separating $CO_2$ from both dry and wet (91% relative humidity) gas mixtures—mixtures whose composition mimicked those found in a flue gas stream, fulfilling criteria (iii) and (vi). Continuous multicycle breakthrough experiments (>45 cycles) were carried out under wet conditions, which proved that the dynamic $CO_2$ uptake capacity in the presence of water remained relatively unchanged over 45 cycles fulfilling criterion (v). The ease of regeneration between each cycle was also accomplished under mild conditions, fulfilling criterion (iv).

Referring now to the drawings, wherein like reference numerals designate identical or corresponding parts throughout the several views.

FIG. 1. illustrates important structural features found on the backbone of a crosslinked, porous polymer synthesized by the method disclosed herein. The structural features are a pyrrole monomer linked to 1,4-benzenediamine monomer by a methylene unit that is derived from p-formaldehyde.

Figure 2A:
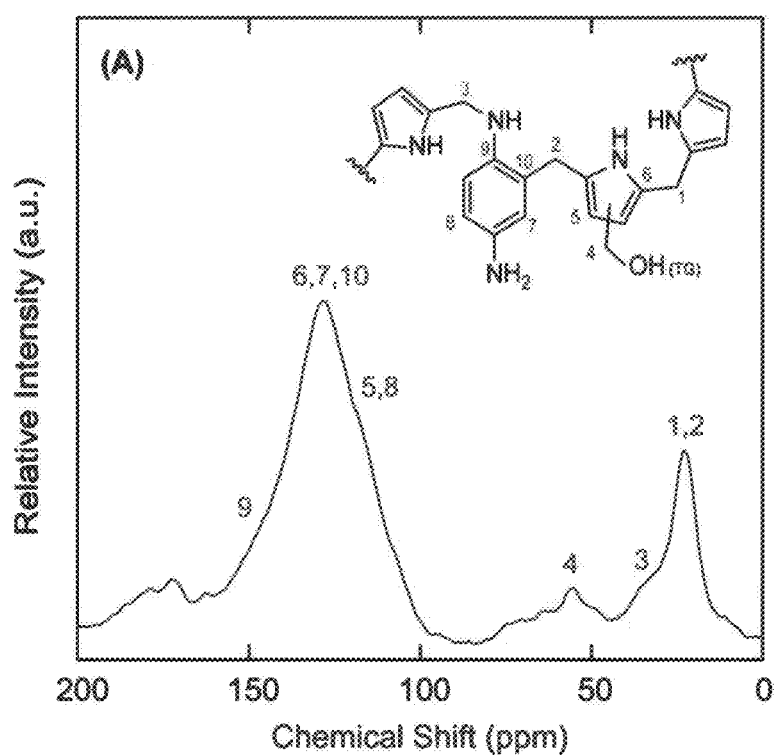
FIG. 2A shows a CP-MAS $^{13}$C NMR spectrum of an inventive polymer, with the corresponding core structure of the polymer provided in the inset for peak assignment, wherein TG means "terminating group"

FIG. 2A shows a CP-MAS $^{13}C$ NMR spectrum of a porous polymer material made according to the Example, with a corresponding core structure of the inventive material provided in the inset for peak assignment. The term "TG" in FIG. 2A means "terminating group."

Due to the amorphous nature of inventive porous polymer materials, as evidenced by powder x-ray diffraction (PXRD), the connectivity of the constituents of the materials produced was assessed using a combination of cross polarization-magic angle spinning (CP-MAS), $^{13}C$ NMR, and FT-IR spectroscopies. The $^{13}C$ NMR spectra of inventive porous polymer materials revealed two resonances corresponding to $CH_2$ species: (i) a broad peak centered at δ=24 ppm, which was assigned to a chemical shift for a $CH_2$ that links aromatic C atoms from either monomer; and (ii) a lower intensity peak at δ=40 ppm, which was assigned to a $CH_2$ linked to the N atom in 1,4-benzenediamine, as seen in FIG. 2A. An additional broad resonance, centered at δ=129 ppm, was assigned to the chemical shifts of aromatic C atoms. A shoulder peak at δ=140 ppm was also noted and attributed to the aromatic C atom to which the amine functionality is located. Further support for these assignments came from observing similar resonances in the $^{13}C$ NMR spectrum for a model polymer based on the polycondensation of 1,4-bezenediamine with p-formaldehyde.

Figure 2B:
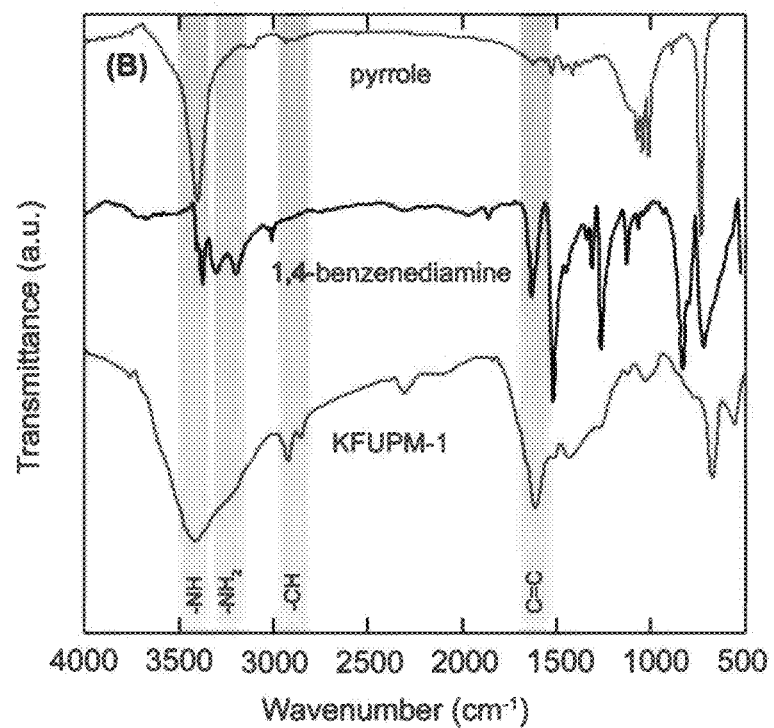
FIG. 2B shows a Fourier transform-infrared (FT-IR) spectrum of an inventive polymer juxtaposed with pure 1,4-benzenediamine and pure pyrrole.

FIG. 2B shows a Fourier transform-infrared spectroscopy (FT-IR) analysis of the exemplary inventive material (below) in comparison to pure 1,4-benzenediamine (middle) and pure pyrrole (top). Absorption bands directly related to characteristic functionalities of the inventive material produced in the Example are highlighted in gray with an indicator near the (wavenumber) x-axis.

To further support the $^{13}C$ NMR data from FIG. 2A, FT-IR spectra were collected in FIG. 2B for the pure pyrrole and 1,4-benzenediamine monomers as well as for the material produced according to the Example. The FT-IR spectra for the inventive material exhibited a broad absorption band centered at 3413 $cm^{-1}$, which is characteristic of the $v_{N-H}$ (pyrrole) stretching frequency. This 3413 $cm^{-1}$ absorption band is confirmed by the spectrum for the pure pyrrole. Evidence for free amine moieties in the material produced according to the Example was provided by the appearance of a shoulder absorption band at approx. 3240 $cm^{-1}$, which is also present in the spectrum for the pure 1,4-benzenediamine. The broadening of this band (approx. 3240 $cm^{-1}$) was attributed to trapped water molecules, i.e., $V_{O-H}$ stretching, as evidenced by TGA-MS spectrum. The TGA-MS spectrum demonstrates that only water molecules were released prior to structural decomposition occurring at 220° C. The FT-IR spectra of inventive materials prepared according to the Example indicate a new absorption band at 2918 $cm^{-1}$ for methylene $V_{C-H}$ stretching modes, as seen in FIG. 2B. This band was distinctly absent in the spectra for both pure monomers. The aromatic $v_{C-C}$ vibrational mode, situated at 1515 $cm^{-1}$, indicative of 1,4-benzenediamine was present in the spectrum of inventive materials, indicating the incorporation of 1,4-benzenediamine within the polymer produced according to the Example.

Figure 3A:
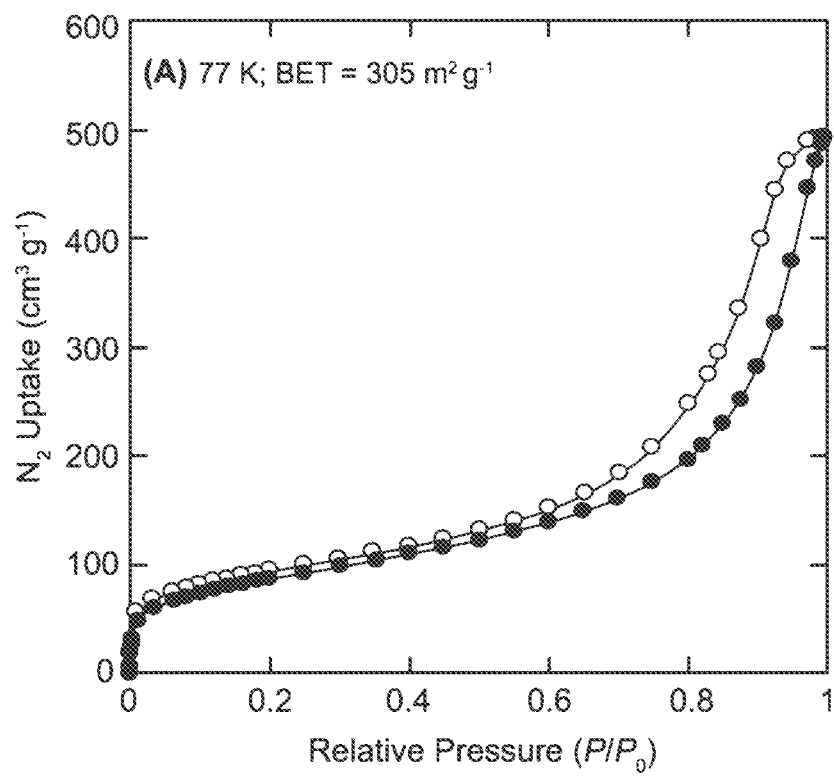
FIG. 3A shows a $N_2$ adsorption isotherm at 77 K for an inventive polymer.

FIG. 3A shows a $N_2$ adsorption isotherm at 77 K for polymer material prepared according to the Example. The architectural stability and permanent porosity of the porous polymer made by the Example was investigated by $N_2$ adsorption isotherm at 77 K (−196° C., or liquid nitrogen temperature), as shown in FIG. 3A. At low relative pressures ($P/P_0$<0.6), the inventive material exhibited a Type-I profile, which is characteristic of a microporous material. At $P/P_0$>0.6, a sharp uptake was observed, indicating the occurrence of inter-particle condensation, i.e., the presence of meso-/macropores between particles. Upon desorption, a small hysteresis was noted, likely as a result of elastic deformation or swelling. Notwithstanding, the Brunauer-Emmett-Teller (BET) model was applied over the $P/P_0$=0.01 to 0.3 range to yield a calculated surface area of 305 $m^2$/g. In terms of practical applicability, the stability of material toward water was examined by carrying out water adsorption measurements. The water adsorption isotherm at 298 K (25° C.) for the porous polymer material produced according to the Example displayed a Type-II profile, which indicates that the material is capable of adsorbing 33.5 wt % water at $P/P_0$>0.9 (90% RH). To assess the long-term stability of the inventive material toward water, a multicycle continuous water isotherm at 40° C. (>20 cycles) was carried out, which demonstrated that porous polymer material produced according to the Example was able to retain its water adsorption properties over long periods of time and use.

Materials made according to the Example can exhibit $CO_2$ uptake capacities of 34.0 $cm^3$/g at 273 K (0° C.) and 760 Torr and 23.4 $cm^3$/g at 298 K (25° C.) and 760 Torr. In contrast, the $N_2$ uptake capacities under the same experimental conditions were found to be 1.2 $cm^3$/g at 273 K and 1.0 $cm^3$/g at 298 K, each at 760 Torr.

The coverage-dependent enthalpy of adsorption ($Q_{st}$) for $CO_2$ was estimated by fitting the isotherms collected at 273 and 298 K with a virial-type expansion equation. The resulting initial $Q_{st}$ value was calculated to be 34 kJ/mol, which indicates the inventive material's strong binding affinity to $CO_2$. The $Q_{st}$ remained relatively constant, reflecting the homogeneous binding strengths over multiple sites at low coverage. The $Q_{st}$ value is moderately high for physisorption-driven materials as compared to materials reported in the art: such as BILP-1 (26.5 kJ/mol) from *Chem. Mater.* 2012, 24, 1511-1517, Azo-COP-1 (29.3 kJ/mol) from *Nat. Commun.* 2013, 4, 1357, and PAF-1 (15.6 kJ/mol) from *Angew. Chem. Int. Ed.* 2012, 51, 7480-7484.

With these results, the $CO_2/N_2$ selectivity was then estimated based on Henry's law. The inventive material demonstrated a unexpectedly high $CO_2/N_2$ selectivities of 249 at 273 K (0° C.) and 141 at 298 K (25° C.). These selectivities are among the highest values reported for crosslinked, porous polymers to date, as seen below in Table 1.

TABLE 1

Surface area, $CO_2$ capture properties, and $CO_2/N_2$ selectivity for the inventive materials compared to selected polymeric materials in related application.

| Material | $A_{BET}$ ($m^2g^{-1}$) | $CO_2$ Uptake ($cm^3 g^{-1}$)[c] | $CO_2/N_2$ Selectivity[b] | $CO_2$ Uptake Capacity - Dry ($cm^3 g^{-1}$)[c] | $CO_2$ Uptake Capacity - Wet ($cm^3 g^{-1}$)[c] | Regeneration Temperature (K) | Ref. |
|---|---|---|---|---|---|---|---|
| KFUPM-1 | 305 | 23.4 | 141 | 8.5 | 15.1 | 298 | This work |
| CTF-FUM-350 | 230 | 57.2 | 102 | 11.4 | — | — | 32 |
| CTF-DCN-500 | 735 | 38.4 | 37 | 8.3 | — | — | 32 |
| LZU-301 | 654 | 35.6 | — | 4.9 | 8.2 | — | 33 |
| [$HO_2C$]$_{100\%}$—$H_2P$—COF | 364 | 76 | 77[d] | 16.4 | — | 353 | 34 |
| FCTF-1 | 662 | 72 | 31[d] | 16.1 | 14.2 | 298[e] | 22 |
| TB-COP-1 | 1340 | 70.7 | 68[d] | — | — | — | 39 |
| PPN-6-$SO_3NH_4$ | 593 | 81 | 196 | 25.8[f] | — | 363 | 8 |
| BPL Carbon | 1210 | 47 | — | 6.0 | 4.2 | — | 36 |
| Carbon Monolith (HCM-DAH-1) | 670 | 58.2 | 28 | 20.9 | 20.3 | 298 | 24 |

Figure 3B:
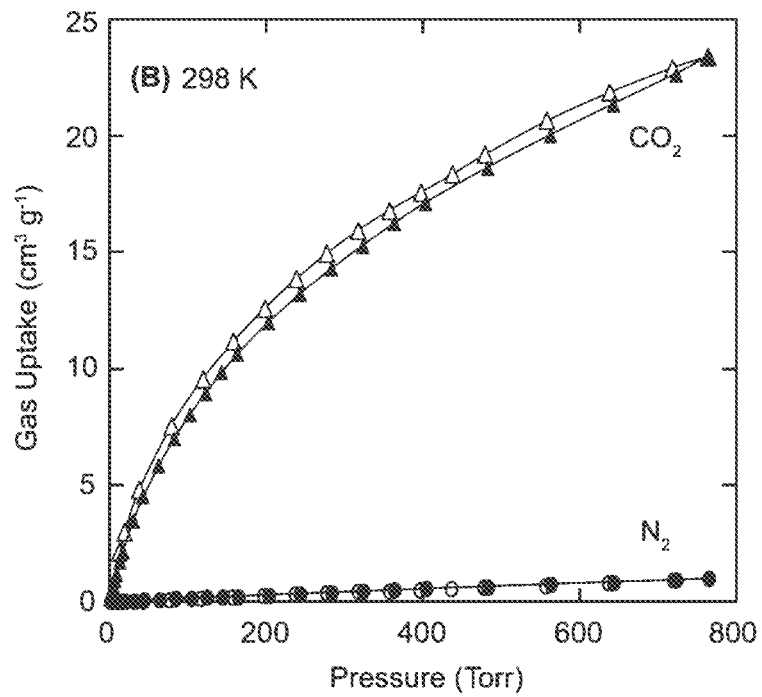
FIG. 3B shows $CO_2$ (in triangles) and $N_2$ (in circles) adsorption isotherms for an inventive polymer at 298 K.

In view of its aromatic amine-rich structure, permanent porosity, and water stability, the inventive material's thermodynamic gas adsorption properties were assessed. Low-pressure, single-component gas adsorption isotherms for $CO_2$ and $N_2$ were measured at 273 K (0° C.) and 298 K (25° C.) up to 760 Torr, as shown in FIG. 3B. FIG. 3B shows a $CO_2$ (triangles) and $N_2$ (circles) adsorption isotherms for polymer material prepared according to the Example at 298 K (25° C.). Filled and open symbols represent adsorption and desorption branches, respectively. The connecting lines serve as a guide to the eye. As depicted in FIG. 3B, polymer material made according to the Example can exhibit steeper $CO_2$ uptake in the low-pressure region at 298 K (25° C.) compared to the $N_2$ uptake. This observation is indicative of stronger polymer-$CO_2$ interactions, i.e., higher affinity, than for $N_2$, which indicates that the inventive materials could serve as an adsorbent for selective $CO_2$ capture, e.g., from flue gas or from other combustion exhaust systems, such as auto, watercraft, or even aircraft exhaust, energy production exhaust, household furnace and/or chimney exhaust, etc.

In Table 1: [a] at 298 K and 760 Torr; [b] calculated from single component isotherms by Henry's law; [c] calculated from dynamic breakthrough experiments with composition 20:80 $CO_2$:$N_2$ v/v; [d] calculated by Ideal Adsorbed Solution Theory at 298 K and 1 bar; [e] regenerated under vacuum; [f] at 313 K; properties not reported are identified with "—"; A is *Environ. Sci. Technol.* 2016, 50, 4869-4876; B is *J. Am. Chem. Soc.* 2017, 139, 4995-4998; C is *Angew. Chem. Int. Ed.* 2015, 54, 2986-2990; D is *Energy Environ. Sci.* 2013, 6, 3684-3692; E is *J. Mater. Chem. A* 2014, 2, 12507-12512; F is *Energy Environ. Sci.* 2013, 6, 3559-3564; G is *Inorg. Chem.* 2016, 55, 6201-6207; and H is *J. Am. Chem. Soc.* 2011, 133, 11378-11388.

Figure 4:
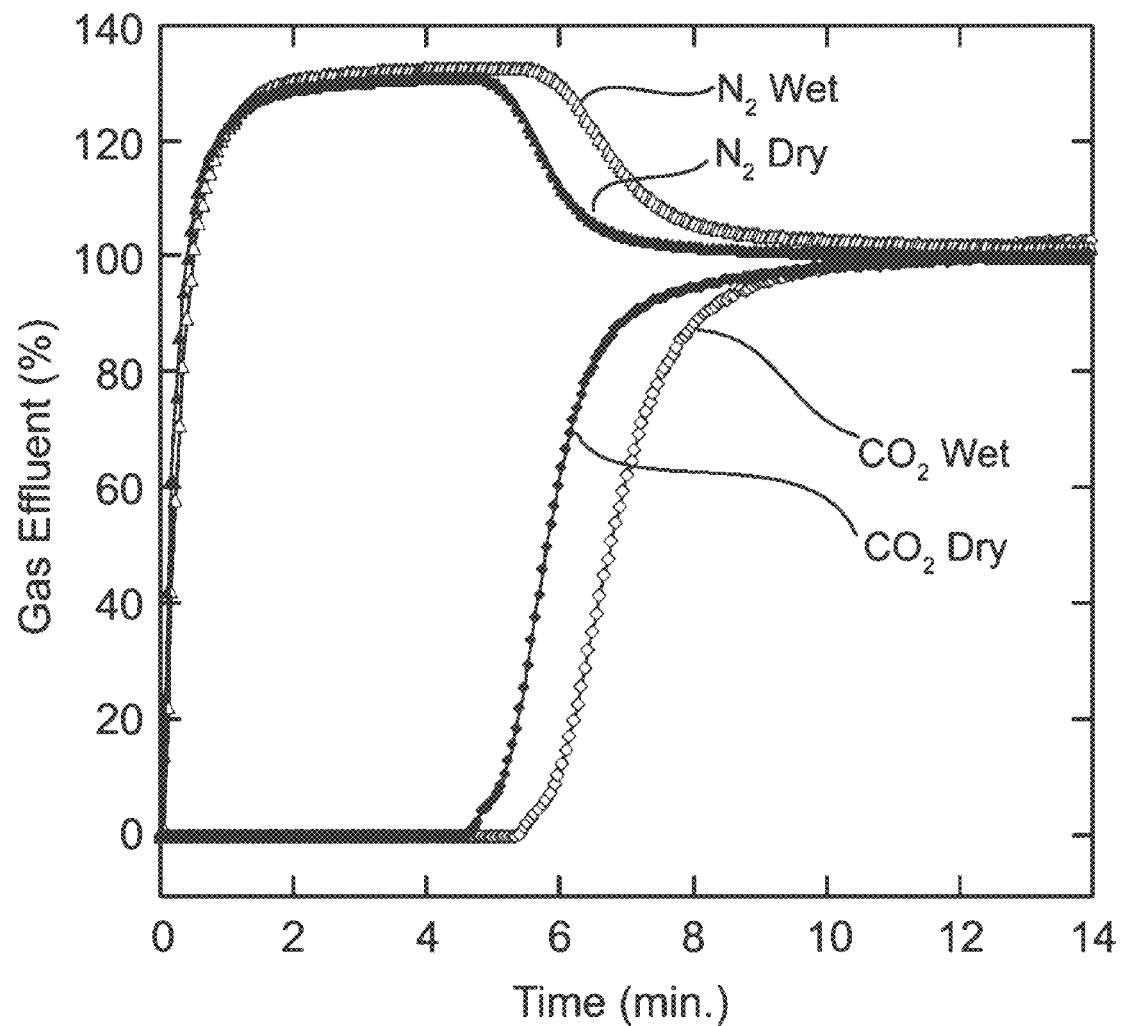
FIG. 4 shows an absorption isotherm for a 20:80 gas mixture containing $CO_2$ and $N_2$, under dry and wet (91% relative humidity) conditions was flowed through a fixed bed of a polymer within the scope of the invention at 298 K and 1 bar.

FIG. 4 shows dynamic $CO_2$ capture by breakthrough experiments with a 20:80 gas mixture containing ($CO_2$:$N_2$), under dry conditions (closed symbols) and wet conditions (91% RH, open symbols), passed at 298 K and 1 bar through a fixed bed of the porous, polymeric material prepared according to the Example. To evaluate the performance of the inventive materials in effectively and selectively capturing $CO_2$ under practical flue gas conditions, dynamic breakthrough experiments were conducted. In a typical experiment, an activated sample of the inventive material was loaded onto a bed and exposed to a gaseous mixture of 20% (v/v) $CO_2$ and 80% (v/v) $N_2$, i.e., volumetric percentages closely resembling flue gas composition. The effluent from the bed was monitored for the breakthrough time, i.e., the time in which adsorbed $CO_2$ breaks through the bed, by an online mass spectrometer.

As seen in FIG. 4, $N_2$ (filled triangles) is solely present in the effluent for 4.79 min, at which point the $CO_2$ (filled diamonds) breakthrough point is observed. Inventive materials can selectively retain $CO_2$ for a significant period of time while $N_2$ passes freely through the material. The corresponding dynamic $CO_2$ uptake capacity of inventive materials, calculated from the breakthrough time, was 8.6 $cm^3/g$. As seen above in Table 1, the capacity of inventive materials is comparable to other porous polymers, such as CTF-FUM-350 (11.4 $cm^3/g$) and CTF-DCN-500 (8.3 $cm^3/g$) described in *Environ. Sci. Technol.* 2016, 50, 4869-4876, as well as COFs, such as LZU-301 (4.9 $cm^3/g$), disclosed in *J. Am. Chem. Soc.* 2017, 139, 4995-4998, and $[HO_2C]_{100\%}$-$H_2P$-COF (16.4 $cm^3/g$), disclosed in *Angew. Chem. Int. Ed.* 2015, 54, 2986-2990.

Water is the third major component in flue gas by volumetric concentration (5-7%). Porous materials typically experience difficulty in selectively capturing $CO_2$ in the presence of water due to competitive adsorption, decreasing $CO_2$ uptake capacity and/or long-term stability and/or recyclability of the material. Porous materials such as metal-organic frameworks (MOFs), zeolitic imidazolate frameworks (ZIFs), and copper silicates have shown an ability to capture $CO_2$ in the presence of water, but few porous polymers have been investigated for this property.

Porous polymeric material made according to the Example was exposed to a ternary gas mixture containing $CO_2$ (20% v/v), $N_2$ (80% v/v), and $H_2O$ (91% RH). As shown in FIG. 4, the inventive material was again able to selectively retain $CO_2$ (open diamonds) while $N_2$ (open triangles) passed through unencumbered. The longer $CO_2$ retention time, i.e., 5.29 min, under wet conditions may be attributed to the inventive material's adsorption of ~33.5 wt % water at 91% RH, which can lead to stronger interactions with $CO_2$. Longer retention times under wet conditions have been observed in other systems. The (wet) dynamic $CO_2$ uptake capacity from the ternary gas mixture ($CO_2/N_2/H_2O$) was calculated to be 9.5 $cm^3/g$ for the inventive material.

Figure 5:
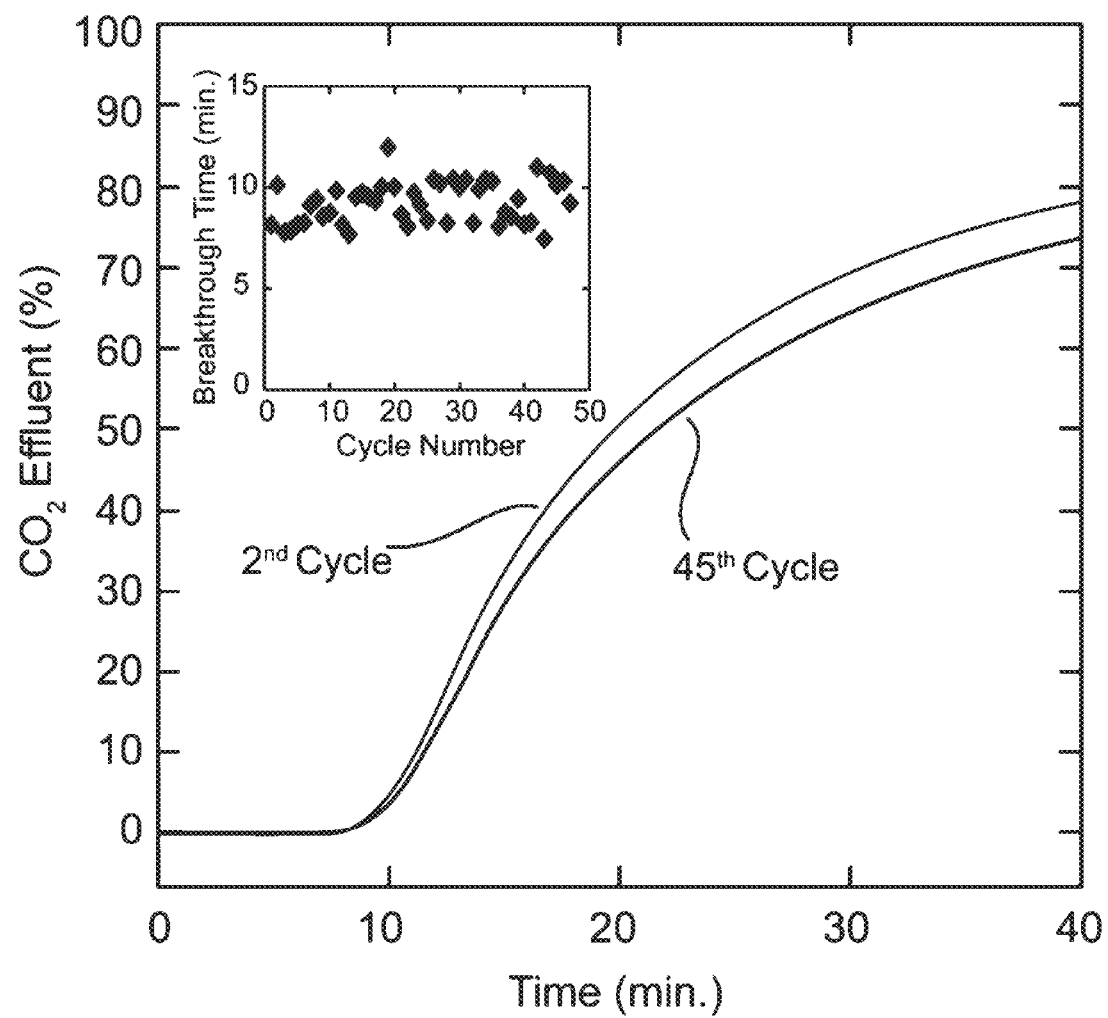
FIG. 5 shows $CO_2$ breakthrough curves for an inventive polymer under wet to conditions indicating no loss in dynamic adsorption capacity over 45 consecutive breakthrough measurements.

For implementation in an industrial setting, an adsorbent material's long-term use and recyclability, without loss in performance, is a critical factor to be considered. FIG. 5 shows $CO_2$ breakthrough curves for the inventive material under wet conditions after cycling. The curves in FIG. 5 indicate that there can be little to no loss in dynamic adsorption capacity over 45 consecutive breakthrough measurements. Multicycle continuous breakthrough measurement (>45 cycles) at 298 K are shown in FIG. 5. For each cycle of the experiment, the results of which are presented in FIG. 5, the inventive material was first exposed to a wet $N_2$ stream (91% RH) until water saturation was detected. At the point of saturation, a dry stream of $CO_2$ (20% v/v) was then added to the wet $N_2$ stream and the effluent was monitored for the breakthrough time. Between each cycle, the inventive material was regenerated by flowing a wet $N_2$ stream through the material at 298 K (25° C.), which regeneration, from an energy cost standpoint, represents a remarkably attractive feature for using the inventive materials as adsorbents for the selective capture of $CO_2$ from real flue gas mixtures.

The inventive material exhibited a surprisingly exceptional stability and recyclability over the course of the multicycle measurements, as seen in FIG. 5. Although the breakthrough time exhibited non-negligible fluctuation over the course of these cycles, the performance, i.e., dynamic $CO_2$ uptake capacity as measured by breakthrough time, remained relatively unchanged at 15 $cm^3/g$ comparing the $2^{nd}$ and the $45^{th}$ cycles, which is seen in Table 1, above, and in FIG. 5.

Numerous modifications and variations of the present invention are possible in light of the above teachings. It is therefore to be understood that within the scope of the appended claims, the invention may be practiced otherwise than as specifically described herein.

The invention claimed is:
1. A polymer, comprising, in polymerized form:
   10 to 20 mol. % of one or more C5 to C10 aryl diamines;
   50 to 65 mol. % of a mono-aldehyde; and
   20 to 35 mol. % of one or more 5-membered heteroaromatic rings,
   wherein mol % is relative to the total moles of the C5 to C10 aryl diamine monomer units, the mono-aldehyde monomer units and the 5-membered heteroaromatic ring monomer units, and the polymer is cross-linked and is porous in bulk form.
2. The polymer of claim 1, wherein the heteroaromatic ring comprises a pyrrole group, an imidazole group, a pyrazole group, a thiazole group, an oxazole group, a furan group, a thiophene group, or a mixture of two or more of any of these groups.
3. The polymer of claim 1, wherein the heteroaromatic ring comprises a pyrrole group.
4. The polymer of claim 1, wherein the heteroaromatic ring comprises an unsubstituted pyrrole group.
5. The polymer of claim 1, wherein the diamine is selected from the group consisting of a 1,4-diaminobenzene, 1,3-diaminobenzene, 2,6-diaminopyridine, 2,5-diaminopyridine, 2,3-diaminopyridine, 2,4-diaminopyrimidine, 1,4-diaminonaphthalene, 1,5-diaminonaphthalene, 1,8-diaminonaphthalene, 2,3-diaminonaphthalene, 1,2-diaminonaphthalene, and a mixture of two or more of any of these.
6. The polymer of claim 1, wherein the diamine is 1,4-diaminobenzene.
7. The polymer of claim 1, wherein the mono-aldehyde is selected from the group consisting of formaldehyde, acetaldehyde, propionaldehyde, butyraldehyde, isobutanal, and a mixture of these.
8. The polymer of claim 1, wherein the mono-aldehyde is formaldehyde.
9. The polymer of claim 1, wherein the diamine, the mono-aldehyde, and the heteroaromatic ring monomer units make up 100 mol. % of the polymer.
10. The polymer of claim 1, wherein the diamine is 1,4-diaminobenzene, the mono-aldehyde is formaldehyde, and the heteroaromatic ring is pyrrole.
11. The polymer of claim 1, meets at least one of the following:
   a porosity in a range of from 250 to 350 $m^2/g$;
   a $CO_2$ uptake capacity in a range of from 25 to 45 $cm^3/g$ at 0° C. and 1 bar;
   a $CO_2$ uptake capacity in a range of from 17.5 to 30 $cm^3/g$ at 25° C. and 1 bar;

a coverage-dependent enthalpy of adsorption ($Q_{st}$) in a range of from 25 to 45 kJ/mol; a $CO_2$ uptake versus $N_2$, with a selectivity in a range of from 200 to 300 at 273 K;

a $CO_2$ uptake versus $N_2$, with a selectivity in a range of from 125 to 165 at 298 K; a dynamic $CO_2$ uptake capacity in a range of from 5 to 12 $cm^3/g$ under dry conditions;

a dynamic $CO_2$ uptake capacity in a range of from 10 to 20 $cm^3/g$ in at least 90% relative humidity; and an absorption diminution of no more than 15% after 45 cycles or more.

12. The polymer of claim 1, which is an amine-functionalized cross linked porous polymer formed by acid catalyzed-condensation of 1,4-benzenediamine, paraformaldehyde, and pyrrole in a molar ratio of 1:2 to 8:1 to 4.

13. The polymer of claim 1, wherein the diamine is present in an amount of from 12.5 to 17.5 mol. %, the mono-aldehyde is present in an amount of from 55 to 60 mol. %, and the heteroaromatic ring is present in an amount of from 25 to 32.5 mol. %.

14. The polymer of claim 13, wherein the diamine is 1,4-diaminobenzene, the mono-aldehyde is formaldehyde, and the heteroaromatic ring is pyrrole.

15. An exhaust treatment or gas storage apparatus, comprising the polymer of claim 1.

16. A method, comprising:
contacting a gas mixture, comprising a first gas and a second gas, with the polymer of claim 1, and thereby separating the first gas from the gas mixture.

* * * * *